United States Patent
Tandel et al.

(10) Patent No.: US 10,805,163 B2
(45) Date of Patent: Oct. 13, 2020

(54) IDENTIFYING DEVICE TYPES BASED ON BEHAVIOR ATTRIBUTES

(71) Applicant: Hewlett Packard Enterprise Development LP, Houston, TX (US)

(72) Inventors: Sebastien Tandel, Santa Clara, CA (US); Rajesh Kumar Ganapathy Achari, Mumbai (IN); Anoop Kumaran Nair, Mumbai (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

(21) Appl. No.: 16/106,789

(22) Filed: Aug. 21, 2018

(65) Prior Publication Data

US 2020/0067777 A1 Feb. 27, 2020

(51) Int. Cl.
H04L 12/24 (2006.01)
H04L 12/26 (2006.01)
H04L 29/06 (2006.01)
G06F 9/448 (2018.01)
H04L 29/08 (2006.01)

(52) U.S. Cl.
CPC ........ *H04L 41/0893* (2013.01); *G06F 9/4498* (2018.02); *H04L 41/12* (2013.01); *H04L 43/065* (2013.01); *H04L 63/0876* (2013.01); *H04L 63/1408* (2013.01); *H04L 67/303* (2013.01)

(58) Field of Classification Search
CPC ............. H04L 63/0876; H04L 63/1408; H04L 67/303; G06F 9/4498
See application file for complete search history.

(56) References Cited

U.S. PATENT DOCUMENTS

| | | | |
|---|---|---|---|
| 7,570,625 B1* | 8/2009 | Ocepek | H04W 12/1202 370/338 |
| 9,124,934 B2 | 9/2015 | Tripathi et al. | |
| 9,225,732 B2* | 12/2015 | Beyah | H04L 63/1408 |
| 9,292,793 B1* | 3/2016 | Lin | G06N 5/04 |
| 9,460,390 B1* | 10/2016 | Lin | G06N 5/04 |
| 9,853,826 B2 | 12/2017 | Shuman et al. | |

(Continued)

FOREIGN PATENT DOCUMENTS

CN 101957795 A 1/2011

OTHER PUBLICATIONS

Create Attribute-based Rules for Dynamic Group Membership in Azure Active Directory, Microsoft, Retrieved Jun. 14, 2018, 34 Pgs.

(Continued)

*Primary Examiner* — Lashonda T Jacobs
(74) *Attorney, Agent, or Firm* — Brooks, Cameron & Huebsch, PLLC (57) ABSTRACT

An example non-transitory memory resource including instructions executable by the processing resource to monitor device information for a plurality of devices, wherein the plurality of devices comprise at least one device of an unknown device type, identify behavior attributes for the plurality of devices based on the monitored device information, cluster the plurality of devices into groups based on the behavior attributes, identify a device type for the plurality of devices based on the group of the plurality of devices; and present identifiers for each of the plurality of devices, based on the device type of the plurality of devices.

20 Claims, 5 Drawing Sheets

(56) References Cited

U.S. PATENT DOCUMENTS

| | | | |
|---|---|---|---|
| 10,038,700 | B1 | 7/2018 | Duchin et al. |
| 10,089,582 | B2* | 10/2018 | Fawaz .................... G06N 5/043 |
| 10,210,351 | B2* | 2/2019 | Sullivan ................. G06F 21/44 |
| 10,218,726 | B2* | 2/2019 | Vasseur ............... H04L 41/0893 |
| 10,440,577 | B1* | 10/2019 | Vasseur ................... H04W 8/24 |
| 2013/0308470 | A1* | 11/2013 | Bevan ................... H04W 36/32 370/252 |
| 2014/0123253 | A1* | 5/2014 | Davis .................... G06F 21/316 726/6 |
| 2015/0113620 | A1* | 4/2015 | Brewer .................. H04L 63/08 726/7 |
| 2015/0280988 | A1* | 10/2015 | Vorst ....................... H04L 12/12 709/220 |
| 2015/0295940 | A1* | 10/2015 | Patel ...................... G06F 21/55 726/29 |
| 2016/0014118 | A1* | 1/2016 | Da ...................... H04L 63/0853 726/4 |
| 2016/0283853 | A1* | 9/2016 | Lee .......................... G06F 9/466 |
| 2016/0283854 | A1* | 9/2016 | Lee .......................... G06N 7/005 |
| 2017/0250879 | A1* | 8/2017 | Chadha ............. G06F 16/24569 |
| 2017/0279829 | A1* | 9/2017 | Vasseur .................. G06N 20/00 |
| 2018/0109551 | A1* | 4/2018 | Wetterwald ......... H04L 63/1458 |
| 2018/0109951 | A1* | 4/2018 | Dipaola ............. G06Q 20/3224 |
| 2018/0159751 | A1 | 6/2018 | Zhang et al. |
| 2018/0191593 | A1* | 7/2018 | De Knijf ............... H04L 63/104 |
| 2018/0278629 | A1* | 9/2018 | McGrew ............. H04L 47/2441 |
| 2019/0306731 | A1* | 10/2019 | Raghuramu .......... H04W 48/16 |
| 2020/0076799 | A1* | 3/2020 | Lackey .................. H04L 63/10 |
| 2020/0162391 | A1* | 5/2020 | Savalle .................. H04L 45/46 |
| 2020/0162425 | A1* | 5/2020 | Vasseur ............... H04L 47/2441 |

OTHER PUBLICATIONS

Grouping Devices and Ports, Cisco, Jun. 11, 2018, 8 Pgs.
Grouping Devices, interfaces, Users and Reports, Statseeker, Retrieved Jun. 11, 2018, 20 Pgs.
PRTG Manual: Object, Paessier, Retrieved Jun. 14, 2018, 12 Pgs.
Search Report and Written Opinion received for PCT Application No. PCT/IB2019/056996, dated Nov. 15, 2019, 16 pages.

* cited by examiner

IDENTIFYING DEVICE TYPES BASED ON BEHAVIOR ATTRIBUTES

BACKGROUND

The classification of devices may be accomplished by clustering devices based on device characteristics. The cluster of devices may be further grouped and labeled based on the cluster.

DETAILED DESCRIPTION

Device infrastructure management may include a database of known devices which may include identifiers for the known devices to indicate information about the devices such as a device type. The information stored in the database about each known device may relate to an operation, a level of security, device characteristics, etc. The classification and labeling of devices can be used as a way for infrastructure management systems to manage the security of the environment in which the devices operate. The classification of a device may provide network infrastructure with information about the security policies that the classified device is allowed to operate. Correctly identifying devices may include determining the device characteristics and correctly identifying the device based on those characteristics. Devices may include network devices and/or client devices. Once correctly identified, device properties (e.g., a level of security) may be assigned to the newly identified device.

As used herein, the term "network device" refers to computing devices that are adapted to transmit and/or receive signaling, and to process information within such signaling across a network. For example, a network device may include a client device, an access point, a controller, a management entity, and/or a data transfer device. Sometimes, a device infrastructure may include multiple devices of an unknown device type which may be categorized based on the characteristics of the devices of unknown device type. As used herein, the term "unknown device" and/or "unknown device type" refers to a device whose type is unknown and/or that is not known and/or present in the current version of the infrastructure device database. As used herein, the term "known device" and/or "known device type" refers to a device whose type is known and/or identified and/or present in the current version of the infrastructure database.

Some approaches may classify devices by creating rules that group devices based on a fixed property (e.g., an interface type used by the device). However, grouping in this manner may not provide an indication of what type of device is being grouped. In other words, rule-based classification based on fixed properties may group multiple types of devices that match the fixed property (e.g., the particular interface type) without being able to identify devices whose properties don't match the fixed property and/or may refrain from identifying devices as the same device type when the devices do not exhibit the fixed property. In other words, rule-based classification may misclassify devices when different device types match the fixed property, and/or fail to identify devices of the same type whose properties do not match the fixed property.

In contrast, determining device information such as statistical properties of devices of unknown device types may identify the type of device. Statistical properties, such as an average number of packets received or transmitted over a time period, may indicate the type of device that would produce a similar behavior footprint. As used herein, the term "behavior footprint" refers to the statistical device properties of a device. In other words, a behavior footprint may be a description of the behavior attributes of a device.

As used herein, the term "behavior attribute" refers to static and/or dynamic network attributes that uniquely correspond to a device type. For example, a behavior attribute may be a Media Access Control (MAC) address, vendor information, Transmission Control (TCP) protocol fingerprinting, Dynamic Host Configuration Protocol (DHCP) fingerprinting, and/or other static/dynamic network behavior attributes from network traffic data. Thus, unknown devices (e.g., devices of an unknown device type) that exhibit similar behavior attributes as known devices (e.g., devices with known device types) may be of the same type of device.

Accordingly, the disclosure is directed to identifying device types based on behavior attributes. In this way, the behavior attributes of multiple devices of an unknown device type may be compared to the behavior attributes of devices with known device types. A clustering equation may be applied to the behavior attributes of the devices (including both unknown devices and known devices) and groups of devices may be generated based on a clustering mechanism. In this way, the devices sharing similar behavior attributes may be identified as being associated with the same device type and identifiers may be provided accordingly. In this way, multiple devices and/or corresponding device types may be identified by their behavior attributes.

Figure 1:
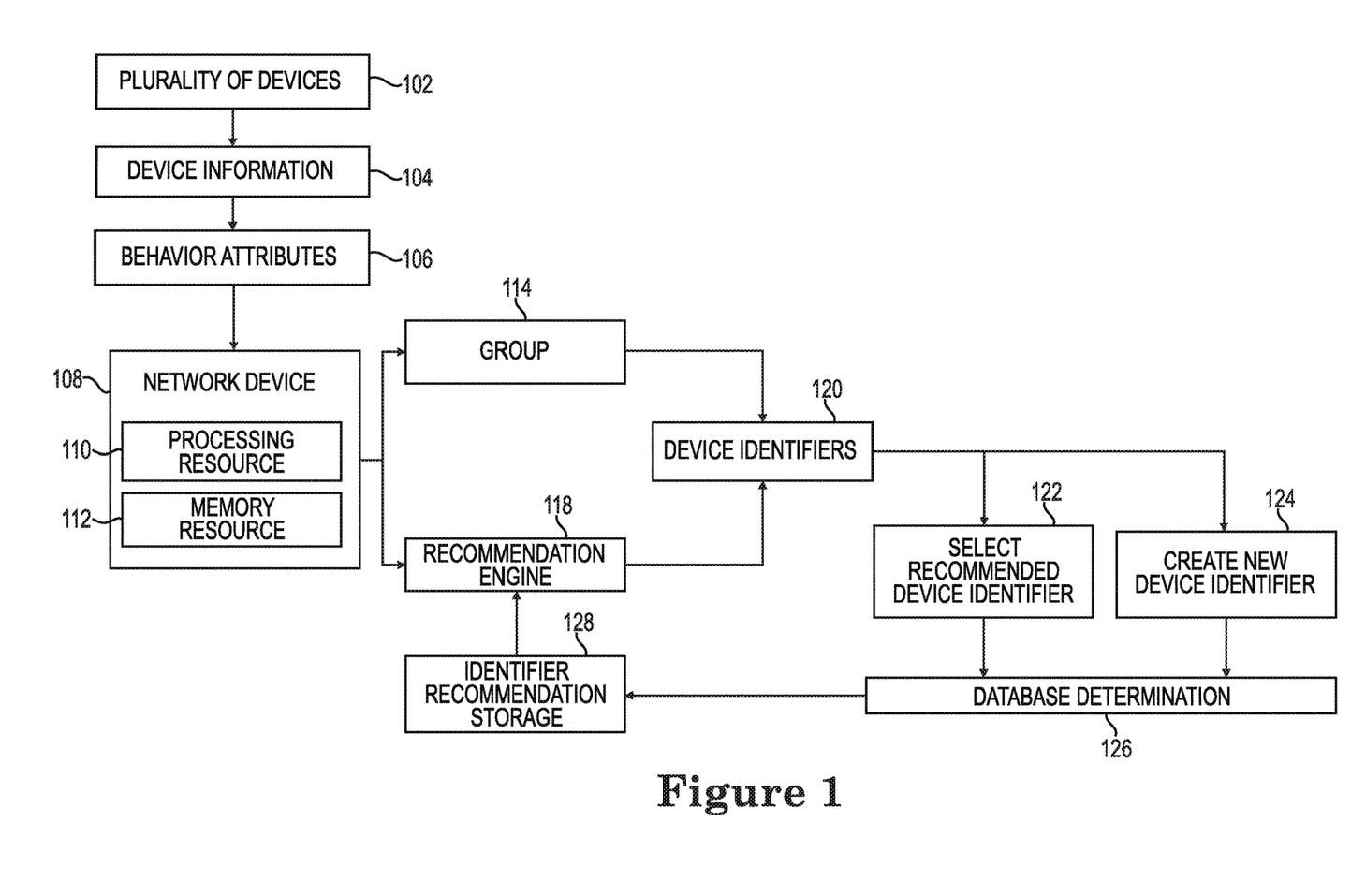
FIG. 1 illustrates an example diagram of an example network device including a non-transitory machine-readable memory resource and processing resource for identifying devices based on behavior attributes consistent with the disclosure.

FIG. 1 illustrates an example diagram of an example network device 108 including a non-transitory machine-readable memory resource 112 and processing resource 110 for identifying the devices 102 based on behavior attributes 106 consistent with the disclosure. The devices 102 may be a plurality of devices 102 and may be collectively referred to herein as the devices 102. The operations are not limited to a particular example described herein and can include additional operations such as those described in the example diagram described in FIG. 2, the example computer readable mediums of FIGS. 3 and 4, and the example method 501 described in FIG. 5.

The network device (e.g., a computing device) 108 may include a processing resource 110. For example, the processing resource 110 may be central processing units (CPUs), semiconductor-based microprocessors, and/or other hardware devices suitable for retrieval and execution of instructions stored in a memory resource 112 (e.g., in a non-transitory computer readable medium). The example processing resource 110 may fetch, decode, and execute instructions. As an alternative, or in addition to, retrieving and executing instructions, the example processing resource 110 may include an electronic circuit that may include electronic components for performing the functionality of executed instructions.

In some examples, the processing resource 110 may be a plurality of hardware processing units that may cause machine-readable instructions to be executed. The processing resource 110 may include central processing units (CPUs) among other types of processing units. The memory resource 112 may be any type of volatile or non-volatile memory or storage, such as random-access memory (RAM), flash memory, storage volumes, a hard disk, or a combination thereof.

The network device 108 may include a wired connection to a computing network (e.g., LAN, Internet, etc.). The network device 108 may act as a wireless connection point for client devices. As used herein, the term "client device" can, for example, refer to a device including a processing resource, memory, and input/output interfaces for wired and/or wireless communication. For example, a client device may include a laptop computer, a desktop computer, a mobile device, an Internet-of-Things device and/or other wireless devices, although examples of the disclosure are not limited to such devices. A mobile device may, for example, refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

In other examples the network device may be an Access Point (AP). As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as read-only memory (ROM), erasable programmable ROM (EPROM), and Flash memory.

A network device (e.g., a computing device) 108 may monitor networks that include a plurality of devices 102 and/or gather device information 104 to classify the devices 102 into groups 114 utilizing a clustering equation based on the behavior attributes 106. The devices 102 may include device information 104 related to the devices 102. As used herein, the term "device information" refers to data and/or operation details that may be related to the devices 102. Device information 104 may be statistical data captured utilizing multiple methods.

In some examples, the device information 104 may be network traffic information, and/or interface type of the devices 102, etc., captured via network traffic monitoring by the network device 108. The device information 104 may identify behavior attributes 106 for the devices 102 and may be captured by the network device 108. For example, the network device 108 may capture statistical device information 104 relating to packets sent to and/or received from the devices 102, where the statistical device information 104 is a behavior attribute 106 of the devices 102. In other examples, the device information 104 and/or behavior attributes 106 may be determined from techniques besides network traffic monitoring.

For example, the network device 108 may capture, via an active scanning technique, device information 104 about the devices 102. Some examples of active scanning techniques are: Windows Management Instrumentation (WMI) scanning, Secure Shell (SSH scanning, and Simple Network Management Protocol (SNMP) scanning. Active scanning techniques may identify behavior attributes 106 that may be missed by network traffic monitoring (e.g., SNMP sysdescr). In another example of device information 104 capture, the device information 104 may be captured and the behavior attributes 106 may be identified from server logs (e.g., web servers, office servers, email servers, etc.). The behavior attributes 106 of the devices 102 may be metadata from server logs of the devices 102. For example, the metadata from various servers that the devices 102 utilize, may be gathered to ascertain device information 104 about the devices 102 (e.g., a device type of the devices 102).

In some examples, metadata may be further extracted from the server logs and the active scanning techniques to determine the behavior attributes 106 of the devices 102. For example, metadata such as the time of day, interface type, the data accessed, and/or the period of time the server was used may indicate the type of device accessing the server. In this way, the behavior attributes 106 may provide a way to determine the types of devices monitored by the network device 108 such that they may be categorized (e.g., grouped) and logged in an infrastructure database. In some examples, the network device 108 may cluster the plurality of devices 102 into groups based on the identified behavior attributes 106 of the plurality of devices 102.

For example, the network device 108 may collect the identified behavior attributes 106 of the plurality of devices 102 and cluster them into groups 114. As used herein, the term "groups" refer to a set of devices (e.g., of the plurality of devices 102) which include similar behavior attributes 106 and/or other device characteristics. The groups (e.g., clustered groups) 114 may be formed by applying the clustering equation to the behavior attributes 106 corresponding to the plurality of devices 102. For example, the clustering equation may establish the groups 114 by matching similar behavior attributes 106 for each device of the plurality of devices 102 such that each device within a group 114 includes similar behavior attributes 106.

In other words, each group 114 may be a result of the clustering equation matching the devices 102 according to similar behavior attributes 106. Thus, the devices 102 grouped together may share similar behavior attributes 106 and may be the same type of device. In this way, the network device 108 may identify a device type for the plurality of devices 102 based on the group 114 of the plurality of devices 102. Device identifiers 120 may be presented by the network device 108 via a recommendation engine 118 such that the groups 114 may be identified and labeled, based on including similar behavior attributes 106.

For example, the network device 108 may present device identifiers 120 for each of the plurality of devices 102, based on the device type of the plurality of devices 102. The presented identifiers 120 may be identifiers suggested by the recommendation engine 118 for device types that have similar behavior attributes 106 to the devices 102 within the groups 114. As used herein, the term "recommendation engine" refers to a portion of hardware and/or instructions stored in a memory resource of a computing device that may automatically generate data based on an input. For example, the recommendation engine 118 may generate identifiers from an identifier recommendation storage 128 based on the behavior attributes 106 of devices 102 within the group 114.

Although not shown in FIG. 1, as to not obscure the examples of the disclosure, the recommendation engine 118 of the network device 108 may include a machine learning model. For example, the network device 108 can input the behavior attributes 106 into a machine learning model to identify the device type of a device 102. For example, the network device 108 may utilize statistical techniques to improve identifier recommendation accuracy based on the behavior attributes 106. In other words, the recommendation engine 118 may recommend identifiers from the identifier recommendation storage 128, or from the results from machine learning model.

The identifiers included in the identifier recommendation storage 128 may be associated with multiple device types and behavior attributes 106 corresponding to the device types. For example, the networking device 108 may determine that the plurality of devices 102 within the groups 114 exhibit behavior attributes 106 that are similar to a device type with a stored identifier "X" (from the identifier recommendation storage 128). Thus, the recommendation engine 118 may suggest the identifier "X" as the device identifier 120. The network device 108 may determine whether the presented identifier "X" (e.g., from the recommendation engine 118) is applicable to the device type based on the behavior attributes 106 of the devices 102 of the group 114. The device identifier 120 "X" from the recommendation engine 118 may be selected at 122, or the network device 108 may create a new device identifier at 124.

For example, the network device 108 may select the recommended identifier "X" at 122 offered by the recommendation engine at 118 based on the behavior attributes 106 being similar the behavior attributes of identified devices "X". In other words, the network device 108 may select the recommended identifiers at 122 in response to determining that the presented identifier "X" is applicable to the device type, where the presented identifier "X" corresponds to the behavior attributes 106 captured by the network device 108. Alternatively, the network device 108 may determine that the plurality of devices 102 may be labeled with a new device identifier based on the group 114.

For example, the network device 108 may create a new identifier at 124 in response to the determination that the presented identifier "X" is not applicable to the device type based on the behavior attributes 106 of the devices 102. For example, the network device 108 and/or a user/administrator may determine that the recommended device identifier "X" is not representative of the devices 102 exhibiting the behavior attributes 106. For example, the network device 108 may determine that the devices 102 grouped at 114 differ from the "X" devices and create a new device identifier "XY" at 124. The devices 102 "XY" may differ from "X" in operation and/or may be intended for a particular use which may differ from the use of the "X" devices. When an identifier, in this example either "X" or XY" is selected/created, the network device 108 may determine how the identifier may be stored for identification of future (e.g., unknown) devices 102.

For example, FIG. 1 illustrates database determination at 126. As mentioned, the recommendation engine 118 may recommend identifiers based on similar behavior attributes 106. The recommended identifiers are stored in the identifier recommendation storage 128. The identifier recommendation storage 128 may further include a local database and a global database, which are discussed in further detail in connection with FIG. 2.

For example, a plurality of devices 102 may be clustered into groups 114 based on the behavior attributes 106 of the plurality of devices 102. The recommended device identifier 120 may be selected at 122 based on the behavior attributes 106 of the devices 102 of the group 114 matching the recommended device identifier 120. Or, the network device 108 may create a new device identifier at 124 if no match to behavior attributes 106 is found in any of device 102 behavior attributes 106 of the groups 114. The selected identifier (either from the recommendation engine 118 or a newly created identifier 124) may be determined at the database determination 126 to be stored in a local and/or global database.

As used herein, the term "local database" refers to a repository which includes device identifiers which may be stored and available to the network device 108 which provided the identifier. For example, a device identifier 120 provided by the network device 108 may be available to other devices within the area managed by the network device 108. In other words, a device identifier 120 from the local database within the identifier recommendation storage 128 may be recommended by the recommendation engine 118 for devices within the network monitored by the network device 108 (e.g., a restricted area). As used herein, the term "restricted area" refers to a specific and/or limited area. A restricted area may also refer to a heightened level of security is applied to the device when compared to a device that is relevant to an unrestricted area. In some examples, the database determination 126 may determine that the identifiers in the local database may be made available to devices outside of the area monitored by the network device 108.

As used herein, the term "global database" refers to a repository which includes device identifiers which may be stored and available to devices that are outside the monitored area of the network device 108. For example, a device identifier 120 provided by the network device 108 may be available to other devices outside the area managed by the network device 108. In other words, a device identifier 120 from the global database within the identifier recommendation storage 128 may be recommended by the recommendation engine 118 for devices inside and outside the network monitored by the network device 108 (e.g., an unrestricted area). As used herein, the term "unrestricted area" refers to a plurality of areas that may not be limited. An unrestricted area may also refer to a lessened level of security is applied to a device when compared to a device that is relevant to a restricted area. In some examples, an identifier within the local database may be determined by an administrator/user to be relevant to devices within the unrestricted areas, and the formally local identifier in the local database may be promoted to a global database.

For example, the selected recommended device identifier at 122 may be determined at the database determination 126 to be relevant to an unrestricted area. For example, assume that the behavior attributes 106 determined for a plurality of devices 102 have a selected recommended identifier "X" at 122. The selected identifier "X", either recommended by the recommendation engine 118 and selected at 122 or created at 124, may be stored by the network device 108 in the identifier recommendation storage 128 in the global database because it is applicable to multiple areas (e.g., unrestricted areas). In other words, the network device 108 may select the presented device identifiers 120 for each of the plurality of devices 102; and at the database determination 126, determine whether the selected identifiers are applicable to a plurality of areas (e.g., an unrestricted area), a particular area (e.g., a restricted area), or combinations thereof.

The examples described in connection with FIG. 1 describe identifying device types based on behavior attributes. A network device 108 may capture device information 104 of a plurality of devices 102 to determine the behavior attributes 106 associated with the plurality of devices 102. The plurality of devices 102 may be clustered into groups 114 based on the behavior attributes 106, the network device 108 may select device identifiers 120 from identifiers recommended by a recommendation engine 118 for the plurality of devices 102 or may create a new device identifier at 124 based on the groups 114. For example, the network device 108 may create a new device identifier at 124 when the behavior attributes 106 of the devices 102 do not match the suggested device identifiers 120. The identifier for the plurality of devices 102 may be stored in an identifier recommendation storage 128 such that future devices of unknown device types may be compared to the local and/or global database stored in the identifier recommendation storage 128 based on the unknown device's behavior attributes 106. In this way, the devices 102 may be identified as a particular type of device based on the behavior attributes 106 exhibited by the devices 102.

Figure 2:
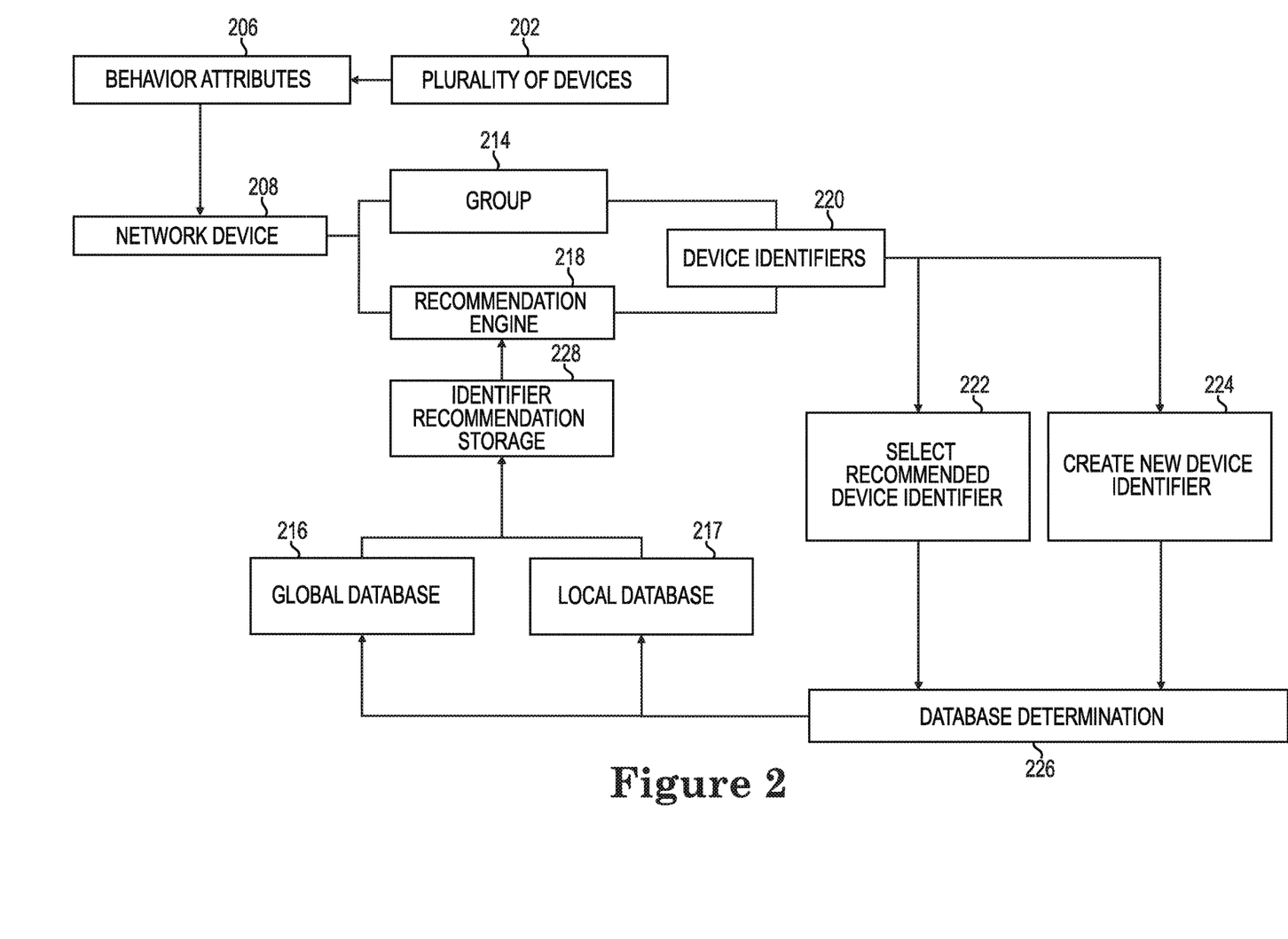
FIG. 2 illustrates an example diagram for identifying a plurality of devices based on behavior attributes consistent with the disclosure.

FIG. 2 illustrates an example diagram for identifying a plurality of devices 202 based on behavior attributes 206 consistent with the disclosure. FIG. 2 includes a network device 208 to cluster a plurality of devices 202 into groups 214 based on behavior attributes 206. Although not shown in FIG. 2, as to not obscure the examples of the disclosure, the network device 108 may include a processing resource and a memory resource similar to the processing resource 110 and the memory resource 112 of FIG. 1. For example, the network device 208 may apply a clustering equation to the behavior attributes 206 of the plurality of devices 202 and group them at 214 based on the similarities of the behavior attributes 206. The network device 208 may provide device identifiers 220 from a recommendation engine 218 based on the behavior attributes of stored devices being similar to the behavior attributes 206 of the plurality of devices 202. The network device 208 may select the device identifiers 220 by selecting the recommended device identifier at 222 based on the behavior attributes 206 of the devices 202 of group 214 matching the behavior attributes 206 of known device types. In other examples, a new device identifier may be created at 224 when the behavior attributes 206 of the devices 202 do not match known device types.

As illustrated in FIG. 2, based on the device identifiers 220 the database determination 226 may determine which database the identifier belongs. For example, the identifier may be determined to belong in the local database 217 when the identifier is relevant to a particular area or tenant. As used herein, the term "tenant" refers to an entity which may be utilizing the device being identified and/or the entity which identified the device. In some examples, a tenant may be a plurality of users, a location, a building, a geographical location, a level of security, etc.

For example, a device of the plurality of devices 202 may be identified based on the behavior attributes 206 to be a device that is relegated to operate on a particular floor of a building (e.g., a particular tenant), a new device identifier 224 "XYZ" based on the group 214 may be created for that device. In this example, the database determination 226 may determine that the identifier "XYZ" for that device be stored in the local database 217. In this way, a different device of the plurality of devices 202 including similar behavior attributes 206 may be offered via the recommendation engine 218, the same identifier "XYZ" when the different device is operational on the particular floor of the building. In other words, a device that is available to a restricted area may be accessible to a particular tenant, and the local database 217 may recommend via the recommendation engine 218 identifiers understood to the particular tenant of a plurality of tenants.

In another example, a device of the plurality of devices 202 may be identified based on the behavior attributes 206 to be a device that is operational in a plurality of floors in a plurality of buildings (e.g., a plurality of tenants), a new device identifier 224 "ABC" based on the group 214 may be created for that device. In this example, the database determination 226 may determine that the identifier "ABC" for that device be stored in the global database 216. In this way, a different device of the plurality of devices 202 including similar behavior attributes 206 may be offered via the recommendation engine 218, the same identifier "ABC" when the different device is operational in a plurality of floors in a plurality of buildings. In other words, a device that is available to an unrestricted area may be accessible to a plurality of tenants and the global database 216 recommends, via the recommendation engine 218 identifiers understood to each tenant of a plurality of tenants.

As illustrated in FIG. 2, the global database 216 and the local database 217 may store the respective identifiers in the identifier recommendation storage 228. In this way, the recommendation engine 218 may recommend an applicable identifier based on the group 214 of clustered devices based on the respective behavior attributes 206. For example, when the behavior attributes 206 of a particular device are similar to the device identifier "ABC" as mentioned above, the recommendation engine 218 may recommend the identifier "ABC" to that particular device, thus a global identifier. In contrast, when the behavior attributes 206 of a different particular device of the plurality of device 202 are similar to the device identifier "XYZ" as mentioned above, the recommendation engine 218 may recommend the identifier "XYZ" to that particular device, thus a local identifier.

As described by examples in connection with FIG. 2, identifying device types based on behavior attributes may include the recommendation engine 218 recommending identifiers that may be understood by the particular tenants that may be utilizing the device. In this way, a network device 208 may recommend identifiers via a recommendation engine 218 based on a comparison between known device behavior attributes and the behavior attributes 206 of the plurality of devices 202.

Figure 3:
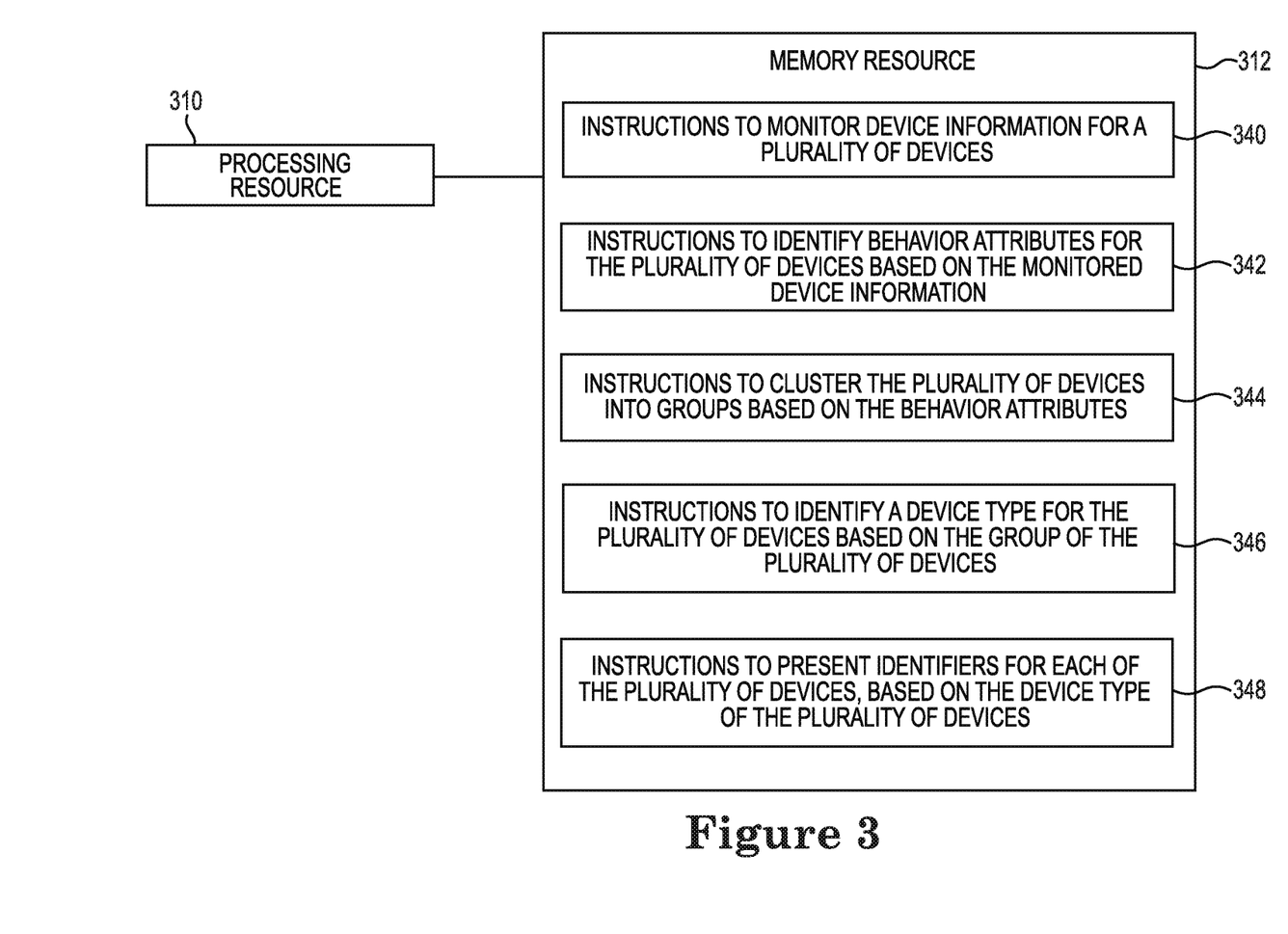
FIG. 3 illustrates an example of a non-transitory machine-readable memory resource and processing resource for identifying a device based on behavior attributes consistent with the disclosure.

FIG. 3 illustrates an example of a non-transitory machine-readable memory resource 312 and processing resource 310 for identifying a device based on behavior attributes consistent with the disclosure. The processing resource 310, and the non-transitory memory resource 312, illustrated in FIG. 3 may be analogous to the elements illustrated in FIGS. 1 and 2. A memory resource, such as the non-transitory memory resource 312, may be used to store instructions (e.g., 340, 342, 344, 346, and 348) executed by the processing resource 310 to perform the operations as described herein. The operations are not limited to a particular example described herein and may include additional operations such as those described with regard to the network device 108, 208 described in connection with FIGS. 1 and 2.

The non-transitory memory resource 312 may store instructions 340 executable by the processing resource 310 to monitor device information (e.g., the device information 104 of FIG. 1) for a plurality of devices (e.g., the plurality of devices 102 of FIG. 1), where the plurality of devices comprise at least one device of an unknown device type. For example, the network device (e.g., the network device 108 of FIG. 1) may capture information about the plurality of devices to determine what type of devices are among the plurality of devices. This may allow the network device to apply particular security protocols or otherwise log a plurality of devices easily. The device information may indicate the device type by identifying the behavior attributes of the devices of the plurality of devices.

For example, the non-transitory memory resource 312 may store instructions 342 executable by the processing resource 310 to identify behavior attributes (e.g., the behavior attributes 106 of FIG. 1) for the plurality of devices based on the monitored device information. The behavior attributes may be related to how a device of the plurality of devices is operating, and the determination of the operation of the devices may indicate the type of device. The network device may apply a clustering equation to the identified behavior attributes of the plurality of devices to group the devices based on similar behavior attributes.

For example, the non-transitory memory resource 312 may store instructions 344 executable by the processing resource 310 to cluster the plurality of devices into groups based on the behavior attributes. In this example, the groups may have similar behavior attributes. The groups having similar behavior attributes may indicate that they are of the same type of device. In this way, device types may be identified based on the statistical device information thus reducing error and misclassification of devices.

For example, the non-transitory memory resource 312 may store instructions 346 executable by the processing resource 310 to identify a device type for the plurality of devices based on the group of the plurality of devices. In this example, the behavior attributes of the plurality of devices are clustered into groups and the groups may indicate a type of device. For example, if the group of devices all utilize the same MAC address vendor information, it may indicate that they are of the same type of device. In this way, the network device may present an identifier to label the group of devices.

For example, the non-transitory memory resource 312 may store instructions 348 executable by the processing resource 310 to present identifiers for each of the plurality of devices, based on the device type of the plurality of devices. In this example, the identifiers presented by the network device may be an identifier that is suggested by a recommendation engine (e.g., the recommendation engine 118 of FIG. 1). In some examples, the recommendation engine may recommend an identifier from a known group of devices that have similar behavior attributes to the plurality of devices clustered into groups. In other examples, a new identifier may be created by the network device, an administrator, and/or a user when the recommended identifier is determined to differ from the device type.

The examples described in connection with FIG. 3 describe identifying device types based on behavior attributes. A network device may capture device information of a plurality of devices to determine the behavior attributes associated with the plurality of devices. The plurality of devices may be clustered into groups based on the behavior attributes, the network device may select identifiers from stored identifiers for the plurality of devices or may create a new identifier based on the clustered groups. The identifier for the plurality of devices may be stored in an identifier recommendation storage such that future device of an unknown device type may be compared to the database based on the device behavior attributes. This may allow the network device to apply particular security protocols or otherwise log a plurality of devices easily. The device information may indicate the device type by identifying the behavior attributes of the devices of the plurality of devices.

Figure 4:
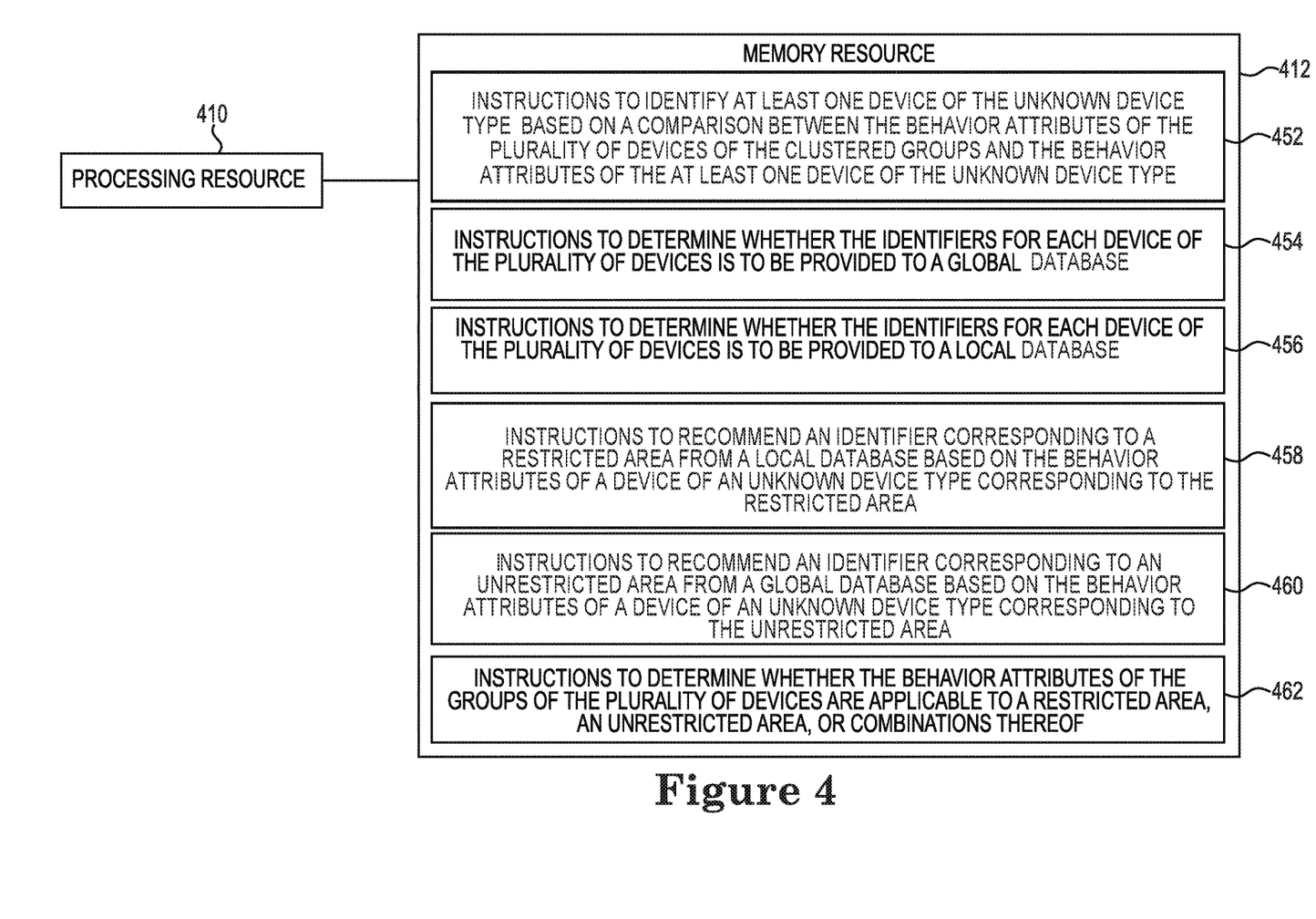
FIG. 4 illustrates an example of a non-transitory machine-readable memory resource and processing resource for identifying a device based on behavior attributes consistent with the disclosure.

FIG. 4 illustrates an example of a non-transitory machine-readable memory resource and processing resource for identifying a device based on behavior attributes consistent with the disclosure. The processing resource 410, and the non-transitory memory resource 412, illustrated in FIG. 4 may be analogous to the elements illustrated in FIGS. 1, 2 and 3. A memory resource, such as the non-transitory memory resource 412, may be used to store instructions (e.g., 452, 454, 456, 458, 460, and 462) executed by the processing resource 310 to perform the operations as described herein. The operations are not limited to a particular example described herein and may include additional operations such as those described with regard to the network device 108, 208 described in connection with FIGS. 1 and 2.

The non-transitory memory resource 412 may store instructions 452 executable by the processing resource 410 to identify at least one device of an unknown device type based on a comparison between the behavior attributes (e.g., the behavior attributes 106 of FIG. 1) of the plurality of devices (e.g., the plurality of devices 102 of FIG. 1) of the clustered groups (e.g., the group 114 of FIG. 1) and the behavior attributes of the at least one device of the unknown device type. In other words, the network device may capture the behavior attributes of a device of an unknown device type and compare them to the behavior attributes of devices of known device types. For example, a device of an unknown device type may include a behavior attribute of utilizing a particular vendor. The behavior attribute of a particular vendor may be compared to known device behavior attributes to determine if a known device utilizes the same vendor. The network device may present an identifier based on the comparison of the unknown device behavior attributes and the known device behavior attributes, where the identifier is the identifier of the known devices. In this way, a device of an unknown device type may be identified based on the behavior attributes captured by the network device. In some examples, the identifiers may be available to unrestricted areas.

For example, the non-transitory memory resource 412 may store instructions 454 executable by the processing resource 410 to determine whether the identifiers for each device of the plurality of devices is to be provided to a global database (e.g., the global database 216 of FIG. 2), wherein the global database stores recommended identifiers for devices deployed within an unrestricted area. In other words, the database determination (e.g., the database determination 126 of FIG. 1) may analyze the identifiers to determine if they can be stored in a global database. The global database may include identifiers that are available to a plurality of tenants and may be understood in a plurality of locations. In other examples, the identifiers may be determined to be stored in a local database.

For example, the non-transitory memory resource 412 may store instructions 456 executable by the processing resource 410 to determine whether the identifiers for each device of the plurality of devices is to be provided to a local database (e.g., the local database 217 of FIG. 2), wherein the local database provides recommended identifiers for devices corresponding to a restricted area. For example, a particular tenant may be a specific building, and the local database may include identifiers which are applicable to the specific building. In other words, the database determination may analyze the identifiers to determine if they may be stored in a local database. The local database may include identifiers that are available to a particular tenant and may be understood by a particular location. In some examples, the devices identified by the behavior attributes may be associated with restricted areas.

For example, the non-transitory memory resource 412 may store instructions 458 executable by the processing resource 410 to recommend an identifier corresponding to a restricted area from a local database based on the behavior attributes of a device of an unknown device type corresponding to the restricted area, wherein the identifier from the local database is specific to the restricted area. In other words, the network device may recommend an identifier from the local database when the device being identified exhibits behavior attributes that correspond to a restricted area. For example, the device being identified based on the behavior attributes may have a level of security that restricts operation to a particular location, such as a particular floor of a building. In this way, the network device may recommend an identifier from a local database. In other examples, the identifiers may correspond to behavior attributes that correspond to an unrestricted area.

For example, the non-transitory memory resource 412 may store instructions 460 executable by the processing resource 410 to recommend an identifier corresponding to an unrestricted area from a global database based on the behavior attributes of a device of an unknown device type corresponding to the unrestricted area, wherein the identifier from the global database is applicable to both a restricted area and the unrestricted area. For example, a plurality of tenants may be a college campus including multiple buildings, and the global database may include identifiers which are applicable to the each building college campus. In other words, the network device may recommend an identifier from the global database when the device being identified exhibits behavior attributes that correspond to an unrestricted area. For example, the device being identified based on the behavior attributes may have a level of security that does not restrict operation to a particular location, such as a particular floor of a building. In other words, the device may operate and include an identifier that may be understood in multiple locations. In this way, the network device may recommend an identifier from a global database. In some examples, the behavior attributes may correspond to both a restricted area, an unrestricted area, or a combination thereof.

For example, the non-transitory memory resource 412 may store instructions 462 executable by the processing resource 410 to determine whether the of the plurality of devices of the groups are applicable to a restricted area, an unrestricted area, or combinations thereof. In other words, the identifiers may be presented based on the behavior attributes of the devices, and the network device may determine a level of security that may be applicable to the devices based on their behavior attributes.

As described by examples in connection with FIG. 4, identifying device types based on behavior attributes may include the recommendation engine recommending identifiers that may be understood by the particular tenants that may be utilizing the device. In this way, a network device may recommend identifiers based on a comparison between known device behavior attributes and the behavior attributes of the plurality of devices.

Figure 5:
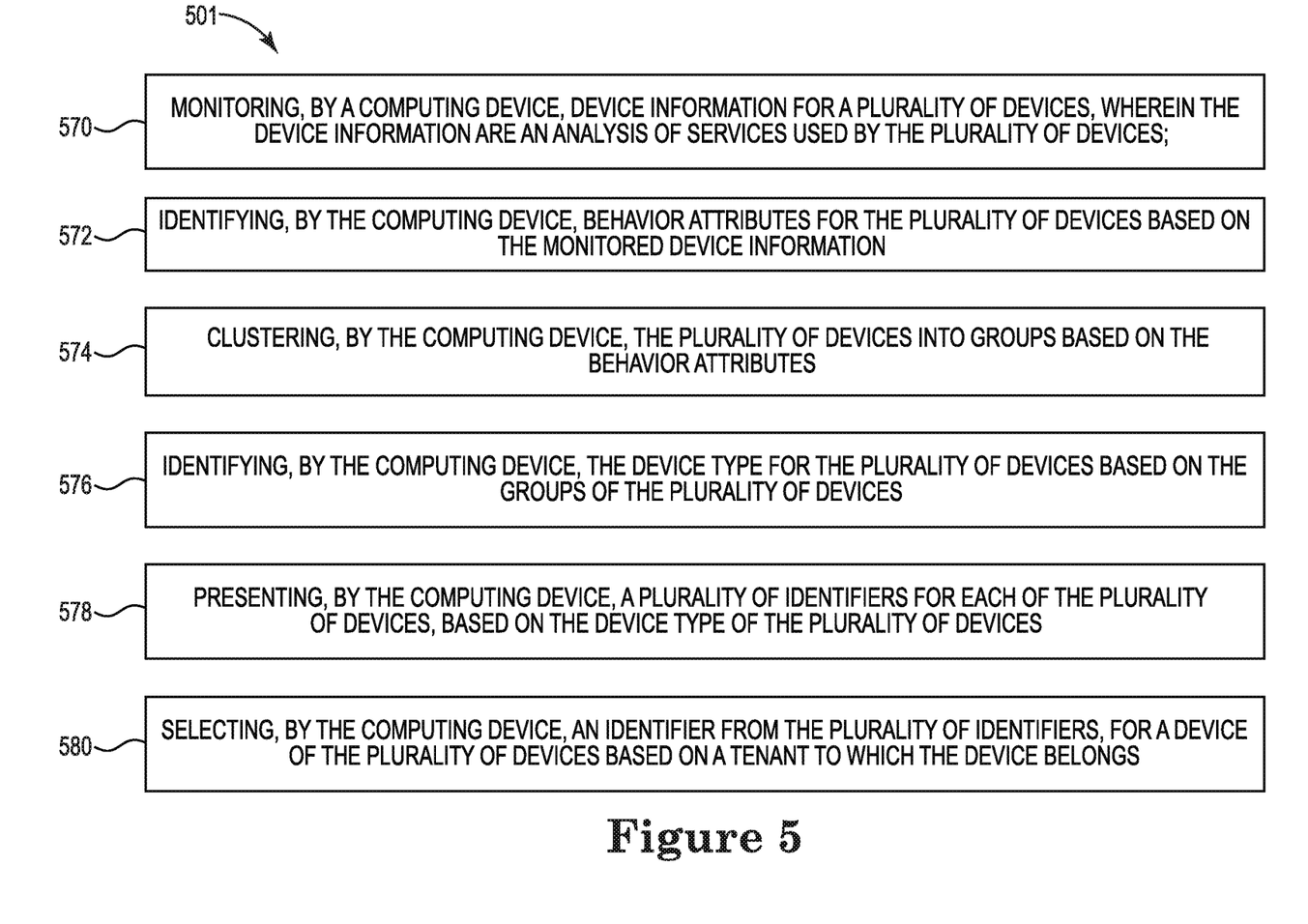
FIG. 5 illustrates an example of a method for identifying devices based on behavior attributes consistent with the disclosure.

FIG. 5 illustrates an example of a method 501 for identifying devices based on behavior attributes consistent with the disclosure. At 570, monitoring, by a computing device (e.g., the network device 108 of FIG. 1), device information (e.g., the device information 104 of FIG. 1) for a plurality of devices (e.g., the plurality of devices 102 of FIG. 1), wherein the device information is an analysis of services of the plurality of devices. In other words, the plurality of device may utilize services such as external applications, wireless services, security protocols, etc. which may contribute to the behavior attributes (e.g., the behavior attributes 106 of FIG. 1) associated with the plurality of devices.

For example, at 572, identifying, by the computing device, behavior attributes for the plurality of devices based on the monitored device information. The monitored device information may provide the computing device with information about the behavior attributes of the devices. For example, if the plurality of devices continually utilizes a particular service the type of device may be related to the particular service. The computing device may apply a clustering equation to the identified behavior attributes.

For example, at 574, clustering, by the computing device, the plurality of devices into groups based on the behavior attributes. The groups of the plurality of devices may be based on the similarities of the behavior attributes. For example, the network device may apply a clustering equation to the plurality of devices based on the similarities of the behavior attributes. In this way, the computing device may identify multiple devices of an unknown device type at the same time based on similar behavior attributes. For example, at 576, identifying, by the computing device, the device type of the plurality of devices based on the clustered groups of the plurality of devices. In other words, a type of device may be determined by the groups of devices of the plurality of devices based on the behavior attributes of the devices within the groups being similar.

For example, at 578, presenting, by the computing device, a plurality of identifiers for each of the plurality of devices, based on the device type of the plurality of devices. In some examples, the computing device may present identifiers from a recommendation engine (e.g., the recommendation engine 118 of FIG. 1) based on known devices with similar device types and behavior attributes. In some examples, the computing device may present a plurality of identifiers from the recommendation engine and the identifiers may be associated with restricted and/or unrestricted areas. For example, at 580, selecting, by the computing device, an identifier from the plurality of identifiers, for a device of the plurality of devices based on a tenant to which the device belongs. For example, the computing device may select a plurality of identifiers that may correspond to a particular area (e.g., a building) to be interpreted by a particular tenant. Specifically, a device of the plurality of devices may be identified as a particular device type based on the behavior attributes of the device. The computing device may select an identifier based on the device type and the behavior attributes, wherein the behavior attributes may provide the computing device with information about a particular tenant (e.g., the particular building).

In some examples, a device of an unknown device type may be identified by the computing device. For example, the computing device may locate a device of an unknown device type and determine behavior attributes of the unknown device. The computing device may compare the behavior attributes of the unknown device to known (and identified) device behavior attributes. The recommendation engine may recommend a plurality of identifiers based on similarities between the behavior attributes of the devices of an unknown device type to the behavior attributes of the plurality of known devices of the groups. In this way, the computing device may identify multiple devices of an unknown device type by comparing behavior attributes of the devices of the unknown device types to the behavior attributes of the known and identified devices. The computing device may select an identifier for the unknown device or may refrain from selecting the recommended identifier and create a new identifier.

The computing device may select an identifier based on the behavior attributes of the devices of the unknown device type being similar to the behavior attributes of the of the plurality of devices of the groups. In contrast, the computing device may refrain from selecting an identifier of the recommended plurality of identifiers based on the behavior attributes of the unknown device being dissimilar to the behavior attributes of the plurality of devices within the groups.

The examples described in connection with FIG. 5 describe identifying device types based on behavior attributes. A computing device may capture device information of a plurality of devices to determine the behavior attributes associated with the plurality of devices. The plurality of devices may be clustered into groups based on the behavior attributes, the computing device may select identifiers from stored identifiers for the plurality of devices or may create a new identifier based on the clustered groups. The identifier for the plurality of devices may be stored in an identifier recommendation storage such that future devices of unknown device types may be compared to the database based on the unknown device behavior attributes. In this way a computing device may identify multiple devices of unknown device types easily by comparing unknown device behavior attributes to known device behavior attributes.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A non-transitory memory resource including instructions executable by a processing resource to:
    receive first monitored device information for a plurality of devices in a network, wherein the plurality of devices in the network correspond with a first device type of multiple device types or a second device type of the multiple device types;
    identify a first behavior attribute for a first subset of the plurality of devices wherein the first behavior attribute corresponds with the first device type for each device of the a first subset of the plurality of devices and does not correspond with the second device type of the multiple device types, and wherein the first device type for each device of the first subset of the plurality of devices corresponds with a device type identifier;
    identify a new device added to the network, wherein the new device corresponds with an unknown device type;
    receive second monitored device information for the new device;
    based on the second monitored device information, determine that the first behavior attribute for the first subset of the plurality of devices corresponds with the new device added to the network, wherein the first behavior attribute is not previously correlated to the new device;
    replace the unknown device type with the first device type;
    select the device type identifier from the first subset of the plurality of devise for the new device; and
    present each device type identifier for the new device and first subset of the plurality of devices.

2. The non-transitory memory resource of claim 1, wherein the first monitored device information includes: Media Access Control (MAC) address vendor information, Transmission Control Protocol (TCP) stack fingerprint, Dynamic Host Configuration Protocol (DHCP) protocol or combinations thereof.

3. The non-transitory memory resource of claim 1, wherein the first behavior attribute is identified based on at least of, an active scanning technique, and an analysis of services of the plurality of devices.

4. The non-transitory memory resource of claim 1, wherein the unknown device type is identified based on a comparison between behavior attributes for the first subset of the plurality of devices and behavior attributes of the new device.

5. The non-transitory memory resource of claim 1, further including instructions to determine whether the device type identifier is to be provided to a global database, wherein the global database stores recommended identifiers for devices deployed within an unrestricted area.

6. The non-transitory memory resource of claim 1, further including instructions to determine whether the device type identifier is to be provided to a local database, wherein the local database stores recommended identifiers for devices deployed within a restricted area.

7. The non-transitory memory resource of claim 6, further including instructions to select the device type identifier corresponding to a restricted area from a local database based on behavior attributes of the new device, wherein the device type identifier from the local database is specific to the restricted area.

8. The non-transitory memory resource of claim 5, further including instructions recommend an identifier corresponding to the unrestricted area from the global dataset based on the behavior attributes of at least one device of unknown device type corresponding to the unrestricted area, wherein the identifier from the global database is applicable to both a restricted area and the unrestricted area.

9. The non-transitory memory resource of claim 8, wherein the unrestricted area is accessible to a plurality of tenants and the global database recommends identifiers understood to each tenant of the plurality of tenants.

10. A computing device comprising:
    a processing resource; and a non-transitory memory resource including instructions executable by the processing resource to:
capture, via an active scanning technique, first monitored device information about a plurality of client devices, wherein the plurality of client devices corresponds with a first device type of multiple device types or a second device type of the multiple device types;
identify a first behavior attribute for a first subset of the plurality of client devices wherein the first behavior attribute corresponds with the first device type for each device of the a first subset of the plurality of client devices and does not correspond with the second device type of the multiple device types, and wherein the first device type for each device of the first subset of the plurality of client devices corresponds with a device type identifier;
identify a new device added to the network, wherein the new device corresponds with an unknown device type;
receive second monitored device information for the new device;
based on the second monitored device information, determine that the first behavior attribute for the first subset of the plurality of client devices corresponds with the new device added to the network, wherein the first behavior attribute is not previously correlated to the new device;
replace the unknown device type with the first device type for the plurality of client devices based on the group of the plurality of client devices;
select the device type identifier from the first subset of the plurality of devise for the new device;
present the device type identifier for the new device and the first subset of the plurality of client devices, based on the client device type of the plurality of client devices; and
determine whether the presented identifiers are applicable to the client device type based on the behavior attributes of the plurality of client devices of the groups.

11. The computing device of claim 10, including instructions to create a new identifier in response to presenting the device type identifier.

12. The computing device of claim 10, comprising instructions to input the first behavior attribute into a machine learning model to identify the client device type of the at last one unknown client new device.

13. The computing device of claim 10, comprising instructions to determine whether the selected device type identifier is applicable to a plurality of tenants, a particular tenant, or combinations thereof.

14. A method comprising:
receiving first monitored device information, by a computing device, for a plurality of devices in a network, wherein the plurality of devices in the network correspond with a first device type of multiple device types or a second device type of the multiple device types;
identifying, by the computing device, a first behavior attribute for a first subset of the plurality of devices wherein the first behavior attribute corresponds with the first device type for each device of the a first subset of the plurality of devices and does not correspond with the second device type of the multiple device types, and wherein the first device type for each device of the first subset of the plurality of devices corresponds with a device type identifier;
identifying a new device added to the network, wherein the new device corresponds with an unknown device type;
receiving second monitored device information for the new device;
based on the second monitored device information, determine that the first behavior attribute for the first subset of the plurality of devices corresponds with the new device added to the network, wherein the first behavior attribute is not previously correlated to the new device;
replacing the unknown device type with the first device type;
selecting the device type identifier from the first subset of the plurality of devise for the new device;
presenting, by the computing device, the device type identifier for the new device and the first subset of the plurality of devices;
locating, by the computing device, the new device;
determining, by the computing device, behavior attributes of the new device; and
recommending, by the computing device, the plurality of identifiers based on similarities between behavior attributes of the new device to the first behavior attribute for the first subset of the plurality of devices.

15. The method of claim 14, further comprising:
locating, by the computing device, the new device;
determining, by the computing device, behavior attributes of the new device; and
recommending, by the computing device, the plurality of identifiers based on similarities between behavior attributes of the new device to the first behavior attribute for the first subset of the plurality of devices.

16. The method of claim 15, further comprising:
selecting an identifier of the recommended plurality of identifiers based on the behavior attributes of the new device being similar to the first behavior attribute for the first subset of the plurality of devices.

17. The method of claim 15, further comprising:
refraining from selecting an identifier of the recommended plurality of identifiers based on the first behavior attribute for the first subset of the new device being dissimilar to the first behavior attribute for the first subset of the plurality of devices.

18. The method of claim 14, wherein the presented identifiers are recommended by a global database which includes identifiers based on groups corresponding to unrestricted area.

19. The method of claim 14, wherein the monitored device information includes a Transmission Control Protocol (TCP) stack fingerprint.

20. The method of claim 14, wherein the devices deployed within a restricted area correspond with a heightened security level in a limited geographical area and devices that are deployed within the unrestricted area correspond with a lower security level than devices that are deployed within the restricted area.

* * * * *